(12) United States Patent
Von Elbwart et al.

(10) Patent No.: US 7,471,740 B2
(45) Date of Patent: Dec. 30, 2008

(54) ARQ RETRANSMISSION WITH REORDERING SCHEME EMPLOYING MULTIPLE REDUNDANCY VERSIONS AND RECEIVER/TRANSMITTER THEREFOR

(75) Inventors: Alexander Golitschek Edler Von Elbwart, Darmstadt (DE); Eiko Seidel, Darmstadt (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 146 days.

(21) Appl. No.: 11/484,776

(22) Filed: Jul. 12, 2006

(65) Prior Publication Data

US 2006/0251185 A1 Nov. 9, 2006

Related U.S. Application Data

(63) Continuation of application No. 10/853,266, filed on May 26, 2004, now Pat. No. 7,110,470, which is a continuation of application No. 10/298,207, filed on Nov. 18, 2002, now Pat. No. 6,798,846.

(30) Foreign Application Priority Data

Nov. 16, 2001 (EP) .................................. 01127244

(51) Int. Cl.
H04L 27/36 (2006.01)
(52) U.S. Cl. ........................................ 375/298; 375/260
(58) Field of Classification Search ................. 375/298, 375/260, 261, 280, 265, 295, 296
See application file for complete search history.

(56) References Cited

U.S. PATENT DOCUMENTS 4,344,171 A 8/1982 Lin et al.
4,495,619 A * 1/1985 Acampora ................... 370/207
4,523,323 A * 6/1985 Nakajima et al. ........... 375/259
4,780,883 A 10/1988 O'Connor et al.
4,866,395 A 9/1989 Hostetter
4,937,844 A 6/1990 Kao
5,134,635 A 7/1992 Hong et al.
5,377,194 A 12/1994 Calderbank
5,396,518 A 3/1995 How (Continued)

FOREIGN PATENT DOCUMENTS

| CN | 1411236 | 4/2003 |
|---|---|---|
| DE | 19705354 | 8/1998 |
| EP | 0938207 | 8/1999 |
| EP | 1043858 A1 | 10/2000 |
| EP | 1447935 | 8/2004 |

(Continued)

OTHER PUBLICATIONS

Office Action dated Aug. 2, 2006 in U.S. Appl. No. 11/003,437.
Office Action dated Aug. 22, 2006 in U.S. Appl. No. 11/232,005.
M. Isaka, et al., "On the design of bit-interleaved coded modulation with Turbo codes", Institute of Industrial Science, The University of Tokyo, 1999, p. 311.

(Continued)

*Primary Examiner*—Emmanuel Bayard
(74) *Attorney, Agent, or Firm*—Dickinson Wright, PLLC

(57) ABSTRACT

An ARQ retransmission method in a communication system, wherein data packets comprising modulation symbols are retransmitted based on an automatic repeat request and subsequently combined with previously received data packets, the symbols of said data packets being modulated by a mapping unit employing a predetermined signal constellation. The retransmitted data packets being retransmitted in form of a selected one of a plurality of different redundancy versions. According to the invention, the bits to be transmitted are reordered prior to modulation over the retransmissions in accordance with the selected redundancy version.

41 Claims, 8 Drawing Sheets

Constellation 1

Constellation 2

U.S. PATENT DOCUMENTS

| | | | |
|---|---|---|---|
| 5,428,643 A * | 6/1995 | Razzell | 375/308 |
| 5,519,356 A | 5/1996 | Greenberg | |
| 5,524,025 A | 6/1996 | Lawrence et al. | |
| 5,822,371 A | 10/1998 | Goldstein et al. | |
| 5,831,561 A | 11/1998 | Cai et al. | |
| 5,914,959 A | 6/1999 | Marchetto et al. | |
| 5,953,376 A | 9/1999 | Wei | |
| 6,126,310 A | 10/2000 | Osthoff et al. | |
| 6,134,694 A | 10/2000 | Uebayashi et al. | |
| 6,138,260 A | 10/2000 | Ketseoglou | |
| 6,233,254 B1 | 5/2001 | Myers | |
| 6,247,150 B1 | 6/2001 | Niemela | |
| 6,311,306 B1 | 10/2001 | White et al. | |
| 6,347,125 B1 | 2/2002 | Dent | |
| 6,463,106 B1 | 10/2002 | Prasanna | |
| 6,473,878 B1 | 10/2002 | Wei | |
| 6,476,734 B2 | 11/2002 | Jeong et al. | |
| 6,567,475 B1 | 5/2003 | Dent et al. | |
| 6,584,190 B1 | 6/2003 | Blessler | |
| 6,606,355 B1 | 8/2003 | Wei | |
| 6,625,165 B1 | 9/2003 | Krishnamoorthy et al. | |
| 6,647,069 B1 | 11/2003 | Segai et al. | |
| 6,738,370 B2 | 5/2004 | Ostman | |
| 6,765,926 B1 | 7/2004 | Price et al. | |
| 6,769,085 B2 | 7/2004 | Von Elbwart et al. | |
| 6,798,846 B2 | 9/2004 | Elbwart et al. | |
| 6,892,341 B2 | 5/2005 | Golitschek et al. | |
| 7,003,050 B2 | 2/2006 | Matsumoto et al. | |
| 2005/0097424 A1 | 5/2005 | Golitschek et al. | |

FOREIGN PATENT DOCUMENTS

| | | |
|---|---|---|
| JP | 64055942 | 3/1989 |
| JP | 02312338 | 12/1990 |
| JP | 03274933 | 12/1991 |
| JP | 06006399 | 1/1994 |
| JP | 6252971 | 9/1994 |
| JP | 738448 | 2/1995 |
| JP | 07143185 | 6/1995 |
| JP | 879325 | 3/1996 |
| JP | 08065279 | 3/1996 |
| JP | 09307517 | 11/1997 |
| JP | 11177648 | 7/1999 |
| JP | 2000188609 | 7/2000 |
| JP | 2000201132 | 7/2000 |
| WO | 9959269 | 11/1999 |
| WO | 03019794 | 3/2003 |

OTHER PUBLICATIONS

M. P. Schmitt; "Improved Retransmission Strategy for Hybrid ARQ Schemes Employing TCM", IEEE 1999, pp. 1226-1228.

S. Lin, et al.; "A Hybrid ARQ Scheme with Parity Retransmission for Error Control of Satellite Channels", IEEE Transaction on Communications, vol. com-30, No. 7, Jul. 1982, pp. 1701-1719.

European Search Report dated May 31, 2002 relating to U.S. Appl. No. 10/295,899.

Japanese Office Action dated Oct. 14, 2003 with English Translation related to U.S. Appl. No. 10/182,569.

US Office Action dated Jan. 12, 2004 in U.S. Appl. No. 10/295,899.

International Search Report dated Oct. 16, 2001 relating to U.S. Appl. No. 10/239,794.

International Search Report dated Jan. 29, 2002 relating to U.S. Appl. No. 10/182,569.

Office Action dated Aug. 22, 2005 in U.S. Appl. No. 11/003,437.

European Office Action dated Sep. 5, 2005.

European Search Report dated Sep. 6, 2005.

Office Action dated Feb. 14, 2006 in U.S. Appl. No. 11/003,437.

Chinese Office Action dated Jan. 20, 2006 with English translation.

Chinese Office Action dated Feb. 10, 2006 with English translation.

"ARQ Error Control Techniques," TSG-RAN Working Group 2 (Radio layer 2 and Radio layer3), TSGR2#2(99)085, Stockholm, pp. 1-5, Mar. 8-11, 1999.

European Search Report dated May 31, 2002.

Krishna R. Narayanan, et al.; "A Novel ARQ Technique using the Turbo Coding Principle", IEEE Communications Letters, IEEE Service Center, Piscataway, US, vol. 1, No. 2, Mar. 1, 1997, pp. 49-51, XP000687091, ISSN: 1089-7798.

6.8 Hybrid ARQ (H-ARQ), H-ARQ with Full IR (H-ARQ-Type-II), 3G TR25.848 V0.6.0 (May 2000), TSG-RAN Working Group 1 meeting #19 Las Vegas, USA, Feb. 27-Mar. 2, 2001, pp. 30-45.

"Enhanced HARQ Method with Signal Constellation Rearrangement" TSG-RAN Working Group 1 Meeting #19, Las Vegas, USA, Feb. 27-Mar. 2, 2001, Panasonic, AH24 (HSDPA), XP-002229383, pp. 1-11.

S. Kallel; "Analysis of a Type II Hybrid ARQ Scheme with Code Combining", IEEE Transactions on Communications, vol. 38, No. 8, Aug. 1990, pp. 1133-1137.

S. Kallel, et al.; "Throughput Performance of Memory ARQ Schemes", IEEE Transactions on Vehicular Technology, vol. 48, No. 3, May 1999, pp. 891-899.

D. Chase; "Code Combining-A Maximum-Likelihood Decoding Approach for Combining an Arbitrary Number of Noisy Packets", IEEE Transactions on Communications, vol. comm.-33, No. 5, May 1985, pp. 385-393.

B. A. Harvey, et al.; "Packet Combining Systems Based on the Viterbi Decoder", IEEE Transactions on Communications, vol. 42, No. 2/3/4, Feb./Mar./Apr. 1994, pp. 1544-1557.

M. P. Schmitt; "Hybrid ARQ scheme employing TCM and packet combining", Electronics Letters, IEE Stevenage, GB, vol. 34, No. 18, Sep. 3, 1998, pp. 1725-1726.

C. Berrou, et al.; "Near Shannon Limit Error-Correcting Coding and Decoding:Turbo-Codes(1)", IEEE 1993, pp. 1064-1070.

S. Le Goff, et al.; "Turbo-Codes and High Spectral Efficiency Modulation", Telecom Bretagne, France Telecom University, IEEE 1994, pp. 645-649.

US Office Action dated Dec. 8, 2003 in U.S. Appl. No. 10/298,207.

European Search Report dated Oct. 14, 2004.

Indian Office Action dated Nov. 3, 2004.

Korean Office Action dated Jan. 5, 2005.

M. Morimoto, et al.; "A Hierarchical Image Transmission System for Multimedia Mobile Communication," First International Workshop on Wireless Image/Video Communications, IEEE COMSOC, EURASIP, Department of Communications Engineering, Faculty of Engineering, Osaka University, Osaka, Japan, pp. 80-84, Sep. 1996.

M. Morimoto, et al.; "A Hierarchical Image Transmission System in a Fading Channel," Department of Electrical Engineering, Faculty of Engineering, Osaka, Japan, IEEE, pp. 769-772, Nov. 1995.

* cited by examiner

ARQ RETRANSMISSION WITH REORDERING SCHEME EMPLOYING MULTIPLE REDUNDANCY VERSIONS AND RECEIVER/TRANSMITTER THEREFOR

This is a continuation of application 10/853,266 filed May 26, 2004 which is a continuation of application number 10/298,207 filed Nov. 18, 2002 (now U.S. Pat. No. 6,798, 846).

FIELD OF THE INVENTION

The present invention relates to an ARQ retransmission method in a communication system. Further, the invention concerns a respective receiver and a transmitter.

BACKGROUND OF THE INVENTION

A common technique in communication systems with unreliable and time-varying channel conditions is to correct errors based on automatic repeat request (ARQ) schemes together with a forward error correction (FEC) technique called-hybrid ARQ (HARQ). If an error is detected by a commonly used cyclic redundancy check (CRC), the receiver of the communication system requests the transmitter to send additional information (data packets retransmission) to improve the probability of correctly decoding the erroneous packet.

A packet will be encoded with the FEC before transmission. Depending on the content of the retransmission and the way the bits are combined with previously transmitted information, S. Kallel, *Analysis of a type II hybrid ARQ scheme with code combining*, IEEE Transactions on Communications, Vol.38, No. 8, August 1990 and S. Kallel, R. Link, S. Bakhtiyari, *Throughput performance of Memory ARQ schemes*, IEEE Transactions on Vehicular Technology, Vol.48, No. 3, May 1999 define three different types of ARQ schemes:

Type I: The erroneous received packets are discarded and a new copy of the same packet is retransmitted and decoded separately. There is no combining of earlier and later received versions of that packet.

Type II: The erroneous received packets are not discarded, but are combined with additional retransmissions for subsequent decoding. Retransmitted packets sometimes have higher coding rates (coding gain) and are combined at the receiver with the stored soft-information from previous transmissions.

Type III: Is the same as Type II with the constraint each retransmitted packet is now self-decodable. This implies that the transmitted packet is decodable without the combination with previous packets. This is useful if some packets are damaged in such a way that almost no information is reusable. If all transmissions carry identified data, this can be seen as a special case called HARQ Type III with a single redundancy version.

HARQ Type II and III schemes are obviously more intelligent and show a performance gain with respect to Type I; because they provide the ability to reuse information from of previously received erroneous packets. There exist basically three schemes of reusing the redundancy of previously transmitted packets:

Soft-Combining

Code-Combining

Combination of Soft- and Code-Combining

Soft-Combining

Employing soft-combining the retransmission packets carry identical information compared with the previously received information. In this case the multiple received packets are combined either by a symbol-by-symbol or by a bit-by-bit basis as for example disclosed in D. Chase, Code combining: *A maximum-likelihood decoding approach for combining an arbitrary number of noisy packets*, IEEE Trans. Commun., Vol. COM-33, pp. 385-393, May 1985 or B. A. Harvey and S. Wicker, *Packet Combining Systems based on the Viterbi Decoder*, IEEE Transactions on Communications, Vol. 42, No. 2/3/4, April 1994.

In case of employing symbol-level combining, the retransmitted packets have to carry identical modulation symbols to the previously transmitted erroneous packets. In this case the multiple received packets are combined at modulation symbol level. A common technique is the maximum ratio combining (MRC), also called average diversity combining (ADC), of the multiple received symbols, where after N transmissions the sum/average of the matching symbols is buffered.

In case of employing bit-level combining the retransmitted packets have to carry identical bits to the previously transmitted erroneous packets. Here, the multiple received packets are combined at bit level after demodulation. The bits can be either mapped in the same way onto the modulation symbols as in previous transmissions of the same packet or can be mapped differently. In case the mapping is the same as in previous transmissions also symbol-level combining can be applied. A common combining technique is the addition of calculated log-likelihood ratios (LLRs), especially if using so-called Turbo Codes for the FEC as known for example from C. Berrou, A. Glavieux, and P. Thitimajshima, *Near Shannon Limit Error-Correcting Coding and Decoding: Turbo-Codes*, Proc. ICC '93, Geneva, Switzerland, pp. 1064-1070, May 1993; S. Le Goff, A. Glavieux, C. Berrou, *Turbo-Codes and High Spectral Efficiency Modulation*, IEEE SUPERCOMM/ICC '94, Vol. 2, pp. 645-649, 1994; and A. Burr, *Modulation and Coding for Wireless Communications*, Pearson Education, Prentice Hall, ISBN 0-201-39857-5, 2001. Here, after N transmissions the sum of the LLRs of the matching bits is buffered.

Code-Combining

Code-combining concatenates the received packets in order to generate a new code word (decreasing code rate with increasing number of transmission). Hence, the decoder has to be aware of how to combine the transmissions at each retransmission instant in order to perform a correct decoding (code rate depends on retransmissions). Code-combining offers a higher flexibility with respect to soft-combining, since the length of the retransmitted packets can be altered to adapt to channel conditions. However, this requires more signaling data to be transmitted with respect to soft-combining.

Combination of Soft- and Code-Combining

In case the retransmitted packets carry some symbols/bits identical to previously transmitted symbols/bits and some code-symbols/bits different from these ones, the identical code-symbols/bits are combined using soft-combing as described in the section titled "Soft-Combining" while the remaining code-symbols/bits will be combined using code-combining. Here, the signaling requirements will be similar to code-combining.

It has been shown in M. P. Schmitt, *Hybrid ARQ Scheme employing TCM and Packet Combining*, Electronics Letters Vol. 34, No. 18, September 1998 that HARQ performance for Trellis Coded Modulation (TCM) can be enhanced by rearranging the symbol constellation for the retransmissions. There, the performance gain results from the maximizing the Euclidean distances between the mapped symbols over the retransmissions, because the rearrangement has been performed on a symbol basis. Considering high-order modulation schemes (with modulation symbols carrying more than two bits) the combining methods employing soft-combining have a major draw-back: The bit reliabilities within soft-combined symbols will be in a constant ratio over all retransmissions, i.e. bits which have been less reliable from previous received transmissions will still be less reliable after having received further transmissions and, analogous, bits which have been more reliable from previous received transmissions will still be more reliable after having received further transmissions. Generally, HARQ schemes do not take into account the variations in bit-reliabilities. These variations downgrade the decoder performance significantly. Mainly, the variations result from two reasons.

First, the varying bit reliabilities evolve from the constraint of two-dimensional signal constellation mapping, where modulation schemes carrying more than 2 bits per symbol cannot have the same mean reliabilities for all bits under the assumption that all symbols are transmitted equally likely. The term mean reliabilities is consequently meant as the reliability of a particular bit over all symbols of a signal constellation.

Figure 1:
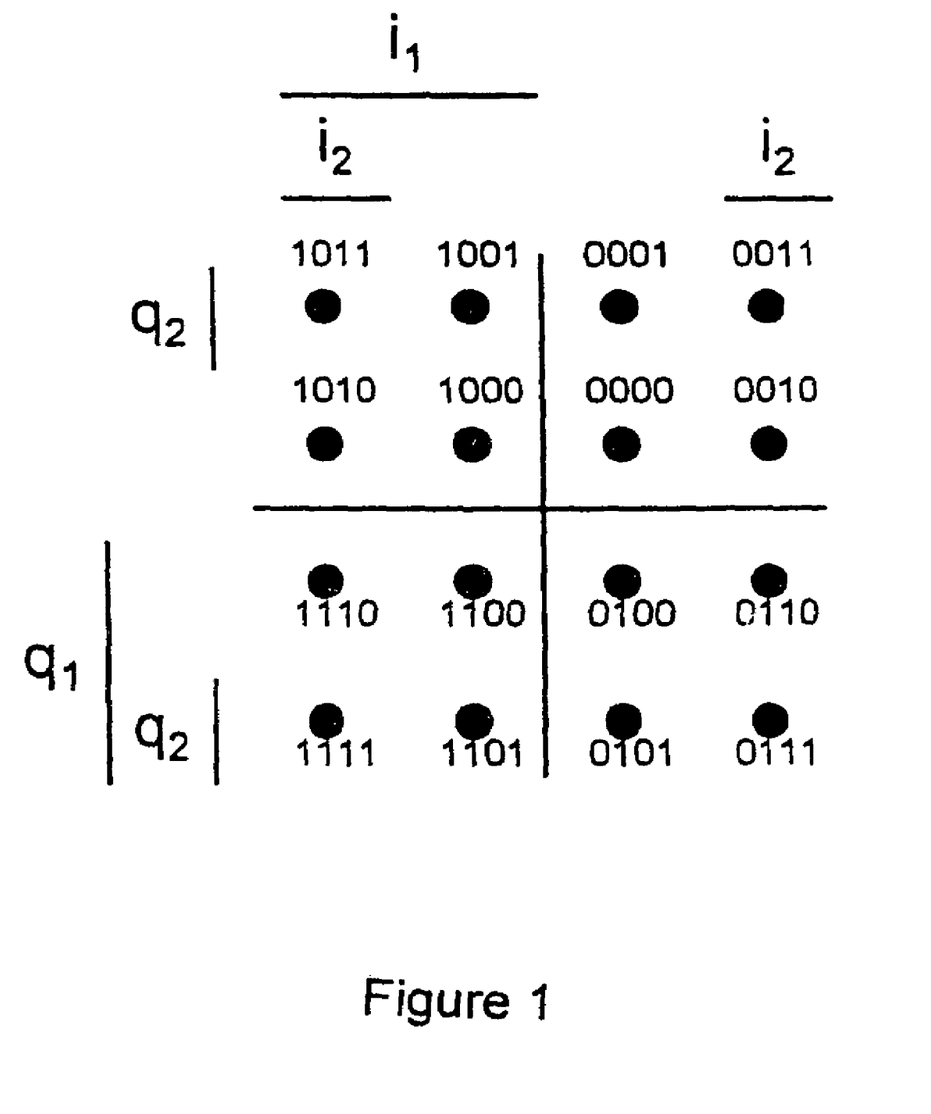
FIG. 1: an exemplary constellation illustrating a 16 QAM modulation scheme with Gray-encoded bit symbols.

Employing a signal constellation for a 16 QAM modulation scheme according to FIG. 1 showing a Gray encoded signal constellation with a given bit-mapping order $i_1q_1i_2q_2$, the bits mapped onto the symbols differ significantly from each other in mean reliability in the first transmission of the packet. In more detail, bits $i_1$ and $q_1$ have a high-mean reliability, as these bits are mapped to half spaces of the signal constellation diagram with the consequences that their reliability is independent from the fact of whether the bit transmits a one or a zero.

In contrast thereto, bits $i_2$ and $q_2$ have a low mean reliability, as their reliability depends on the fact of whether they transmit a one or a zero. For example, for bit $i_2$, ones are mapped to outer columns, whereas zeros are mapped to inner columns. Similarly, for bit $q_2$, ones are mapped to outer rows, whereas zeros are mapped to inner rows.

For the second and each further retransmissions the bit reliabilities will stay in a constant ratio to each other, which is defined by the signal constellation employed in the first transmission, i.e. bits $i_1$ and $q_1$ will always have a higher mean reliability than bits $i_2$ and $q_2$ after any number of retransmissions.

Second, employing partly soft-combining, suppose that all transmitted bits would have identical reliability after the first transmission. Even then variations in bit reliabilities would be introduced over retransmissions, because reliabilities for those bits which are retransmitted (and soft-combined) would increase, whereas reliabilities of not retransmitted bits would stay unchanged. Moreover, bits which are not transmitted in the first transmission and then transmitted in retransmissions (transmitting additional redundancy) emphasize this effect.

In co-pending PCT/EP01/01982 a method has been suggested that in order to enhance the decoder performance, it would be quite beneficial to have equal or near to equal mean bit reliabilities after each received transmission of a packet. Hence, the bit reliabilities are tailored over the retransmissions in a way that the mean bit reliabilities get averaged out. This is achieved by choosing a predetermined first and at least second signal constellation for the transmissions, such that the combined mean bit reliabilities for the respective bits of all transmissions are nearly equal. i.e. bits which have been highly reliable in the first transmission are mapped in such a way that they become less reliable in the second transmission and vice versa.

Hence, the signal constellation rearrangement results in a changed bit mapping, wherein the Euclidean distances between the modulation symbols can be altered from retransmission to retransmission due to the movement of the constellation points. As a result, the mean bit reliabilities can be manipulated in a desired manner and averaged out to increase the performance the FEC decoder at the receiver.

In the solution proposed above, the benefits of the constellation rearrangement are realized for the concept of the HARQ TYPE II/III single redundancy version schemes.

SUMMARY OF THE INVENTION

The object of the present invention is to provide an ARQ retransmission method and transmitter, which effectively avoids downgrading of the decoder performance caused by the variations in bit reliabilities.

The object is solved by a method, transmitter and receiver as set forth in the independent claims.

The invention is based on the recognition that the conventional schemes do not consider this specific content (set of bits) of each transmission for reordering the bits. Hence, in order to obtain a performance gain, the reordering has to be done depending on the content of each transmitted redundancy version. Consequently, the invention can be seen as providing an ARQ Type-II/III scheme using multiple redundancy versions under consideration of the content of the transmitted redundancy version. This results in a significant gain in the decoder performance.

BRIEF DESCRIPTION OF THE DRAWINGS

For a better understanding of the invention, preferred embodiments, which will be described in the following with reference to the accompanying drawings show.

DETAILED DESCRIPTION OF EMBODIMENTS

In the following the concept of a Log-Likelihood-Ratio (LLR) will be described as a metric for the bit reliabilities. First the straight forward calculation of the bit LLRs within the mapped symbols for a single transmission will be shown. Then the LLR calculation will be extended to the multiple transmission case.

Single Transmission

The mean LLR of the i-th bit $b_n^i$ under the constraint that symbol $s_n$ has been transmitted for a transmission over a channel with additive white gaussian noise (AWGN) and equally likely symbols yields $$LLR_{b_n^i|r_n}(r_n) = \log\left[\sum_{(m|b_m^i = b_n^i)} e^{-\frac{E_S}{N_0} \cdot d_{n,m}^2}\right] - \log\left[\sum_{(m|b_m^i \neq b_n^i)} e^{-\frac{E_S}{N_0} \cdot d_{n,m}^2}\right], \quad (1)$$

where $r_n = s_n$ denotes the mean received symbol under the constraint the symbol $s_n$ has been transmitted (AWGN case), $d_{n,m}^2$ denotes the square of the Euclidean distance between the received symbol $r_n$ and the symbol $s_m$, and $E_S/N_0$ denotes the observed signal-to-noise ratio.

It can be seen from Equation (1) that the LLR depends on the signal-to-noise ratio $E_S/N_0$ and the Euclidean distances $d_{n,m}$ between the signal constellation points.

Multiple Transmissions

Considering multiple transmissions the mean LLR after the k-th transmission of the i-th bit $b_n^i$ under the constraint that symbols $s_n^{(j)}$ have been transmitted over independent AWGN channels and equally likely symbols yields $$LLR_{b_n^i|\bigcap_{j=1}^k r_n^{(j)}}(r_n^{(1)}, r_n^{(2)}, \ldots, r_n^{(k)}) = \quad (2)$$

-continued $$\log\left[\sum_{(m|b_m^i = b_n^i)} e^{-\sum_{j=1}^k \left(\frac{E_S}{N_0}\right)^{(j)} \cdot (d_{n,m}^{(j)})^2}\right] -$$

$$\log\left[\sum_{(m|b_m^i \neq b_n^i)} e^{-\sum_{j=1}^k \left(\frac{E_S}{N_0}\right)^{(j)} \cdot (d_{n,m}^{(j)})^2}\right],$$

where j denotes the j-th transmission ((j−1)-th retransmission). Analogous to the single transmission case the mean LLRs depend on the signal-to-noise ratios and the Euclidean distances at each transmission time.

It is clear to a skilled person, that an approximation of the LLRs can be obtained by a simplified calculation to the above detailed equations.

In the following, the case of a 16-QAM system will be exemplarily considered resulting in 2 high reliable and 2 low reliable bits, where for the low-reliable bits the reliability depends on transmitting a one or a zero (see FIG. 1). Hence, overall there exist 2 levels of reliabilities wherein the second level can be further subdivided.

Level 1 (High Reliability, 2 bits): Bit mapping for ones (zeros) separated into the positive (negative) real half space for the i-bits and the imaginary half space the q-bits. Here, there is no difference whether the ones are mapped to the positive or to the negative half space.

Level 2 (Low Reliability, 2 bits): Ones (zeros) are mapped to inner (outer) columns for the i-bits or to inner (outer) rows for the q-bits. Since there is a difference for the LLR depending on the mapping to the inner (outer) columns and rows, Level 2 is further classified:

Level 2a: Mapping of $i_n$ to inner columns and $q_n$ to inner rows respectively.

Level 2b: Inverted mapping of Level 2a: Mapping of $i_n$ to outer columns and $q_n$ to outer rows respectively.

To ensure an optimal averaging process over the transmissions for all bits the levels of reliabilities have to be altered.

It has to be considered that the bit-mapping order is open prior initial transmission, but has to remain through retransmissions, e.g. bit-mapping for initial transmission: $i_1 q i_2 q_2$ ⇒ bit-mapping all retransmissions: $i_1 q_1 i_2 q_2$.

Figure 2:
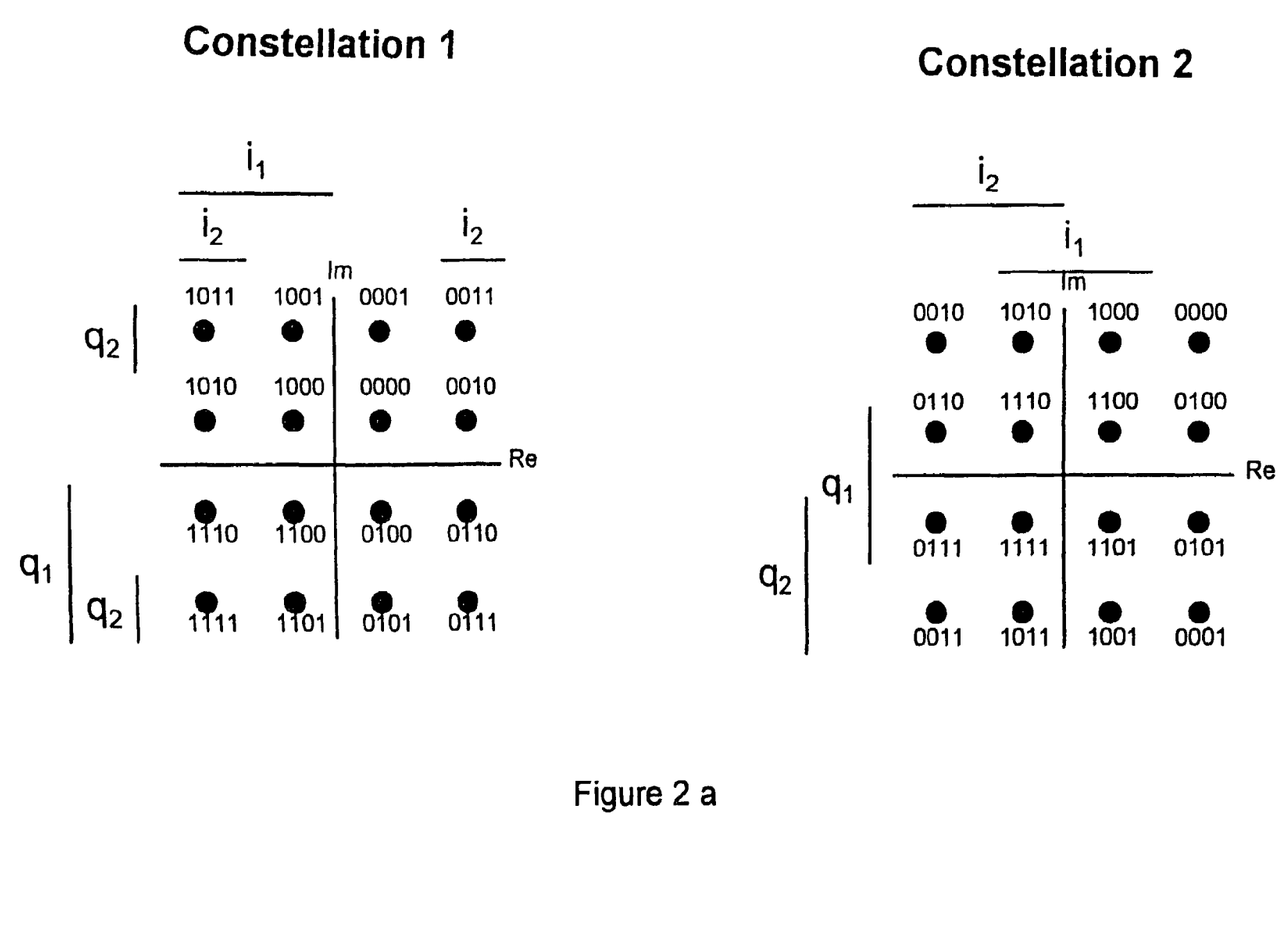
FIGS. 2*a* and 2*b*: two examples for signal constellations for a 16 QAM modulation scheme with Gray-encoded bit symbols.

Some examples for possible constellations are shown in FIG. 2. The resulting bit reliabilities according to FIG. 2 are given in Table 1.

TABLE 1

| Constellation | bit $i_1$ | bit $q_1$ | bit $i_2$ | bit $q_2$ |
|---|---|---|---|---|
| 1 | High Reliability (Level 1) | High Reliability (Level 1) | Low Reliability (Level 2b) | Low Reliability (Level 2b) |
| 2 | Low Reliability (Level 2a) | Low Reliability (Level 2a) | High Reliability (Level 1) | High Reliability (Level 1) |
| 3 | Low Reliability (Level 2b) | Low Reliability (Level 2b) | High Reliability (Level 1) | High Reliability (Level 1) |
| 4 | High Reliability (Level 1) | High Reliability (Level 1) | Low Reliability (Level 2a) | Low Reliability (Level 2a) |

In the following, it is assumed that m denotes the retransmission number parameter, with m=0 denoting the first transmission of a packet in the ARQ context. Further let b denote the number of bits that form a symbol in the mapping entity. Typically, b can be any integer number, where the most often used values for communication systems are an integer power of 2.

Without loss of generality it can be further assumed that the number of bits n that are used as input to the interleaving process is dividable by b, i.e. n is an integer multiple of b. Those skilled in the art will perceive that if this should not be the case, then the sequence of input bits can be easily appended by dummy bits until the above condition is met.

Figure 3:
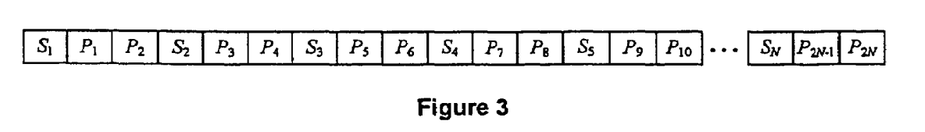
FIG. 3: a generated bit sequence from a rate 1/3 FEC encoder.
Figure 4:
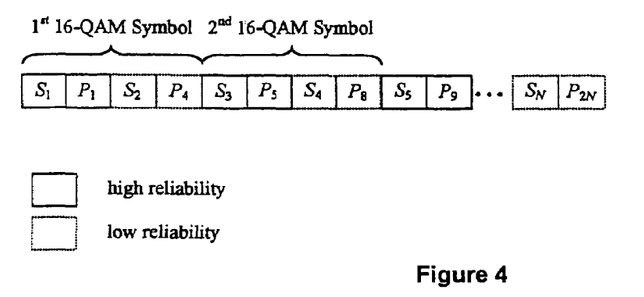
FIG. 4: a chosen sequence for a rate 1/2 transmission system generated from the sequence shown in FIG. 3 with an indication of the bit reliabilities.

In the following an example of a simple Gray-mapped 16-QAM transmission scheme with FEC rate 1/2($S_n$: systematic bits—$P_n$: parity bits), which is generated from a systematic encoder of rate 1/3(see FIG. 3) by puncturing will be considered. A sequence and ordering of bits as shown in FIG. 4 could be selected for the $1^{st}$ transmission (TX). FIG. 4 shows the generated sequence of FIG. 3 with an indication of the bit reliabilities.

A simple conventional HARQ Type-III scheme with a single redundancy version would transmit in all requested retransmissions the identical sequence (having the identical mapping $M_1$ or identical interleaving $I_1$). The $1^{st}$ transmission is usually not interleaved, however also not to interleave can be viewed as having an interleaver with equal input and output streams. This results after combining all received (and requested) transmissions in large variations of bit reliabilities. E.g. $S_1$ and $P_1$ would be highly reliable (transmitted n times with high reliability) whereas $S_2$ and $P_4$ would be less reliable (transmitted n times with low reliability). As stated earlier, this will downgrade decoding performance at the receiver.

The performance of this basic scheme can be increased by switching the reliabilities for required retransmissions to average out the reliabilities for all transmitted bits. This can be achieved by a number of different specific implementations, where 2 possible solutions are depicted below in FIG. 5 and FIG. 6. This technique can be implemented either by interleaving the bits differently than in the $1^{st}$ transmission or by using different mapping rules for the modulation symbols. In the following this will be denoted as using a $2^{nd}$ mapper $M_2$ or a $2^{nd}$ interleaver $I_2$.

Figure 5:
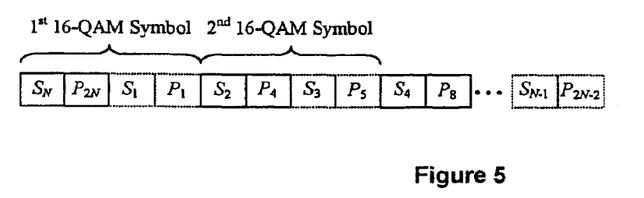
FIG. 5: a bit sequence for the second transmission, wherein the bits are shifted by two to the right.

FIG. 5 shows a bit sequence for the $2^{nd}$ transmission, wherein, in order to average bit reliabilities, the bits are shifted by 2 to the right using different interleavers for transmission.

Figure 6:
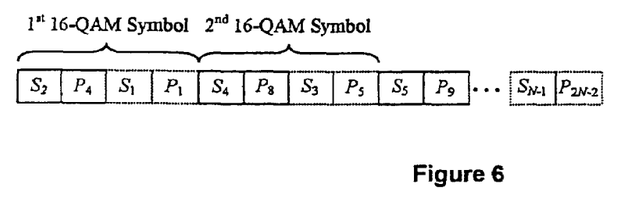
FIG. 6: a bit sequence for the second transmission, wherein the bit positions are switched using different mappers.

FIG. 6 shows a bit sequence for the $2^{nd}$ transmission, wherein, in order to average bit reliabilities, the bit positions are switched using different mappers for transmissions.

In case of using just 2 different mappers ($M_n$) or interleavers ($I_n$) all successive transmissions are then mapped or interleaved such that no mapper/interleaver is used 2 times more often than the other one e.g.:

TABLE 2

| TX | Strategy 1 | Strategy 2 |
|---|---|---|
| 1 | $I_1/M_1$ | $I_1/M_1$ |
| 2 | $I_2/M_2$ | $I_2/M_2$ |
| 3 | $I_1/M_1$ | $I_2/M_2$ |
| 4 | $I_2/M_2$ | $I_1/M_1$ |
| 5 | $I_1/M_1$ | $I_1/M_1$ |
| 6 | $I_2/M_2$ | $I_2/M_2$ |
| 7 | $I_1/M_1$ | $I_2/M_2$ |
| ... | ... | ... |

It should be noted that for 16-QAM the usage of 4 different mappers provides a better performance and just using 2 mappers provides a sub optimum solution. 2 mappers are chosen to keep the example simple.

It can be seen from the table above the performances of the strategy 1 and 2 are equal or similar, hence, it does not make a difference if choosing mapper/interleaver $M_1/I_1$ or $M_2/I_2$ for the $3^{rd}$ TX (transmission). For the $4^{th}$ TX, however, it has to be taken care to choose the complementary mapper/interleaver with respect to the $3^{rd}$ TX.

A simple prior art HARQ Type-III scheme with multiple redundancy versions would retransmit the systematic bits in the $2^{nd}$ TX plus the additional parity bits, which have not been transmitten in the first TX. For simplicity the example is chosen such that the number of bits per transmissions is kept constant and exactly 2 transmissions can carry all encoded bits (systematic and parity). To guarantee self-decodable retransmissions all systematic bits are retransmitted. It will however be appreciated by those skilled in the art, that also non-self decodable retransmissions can be used to carry out the invention.

Figure 7:
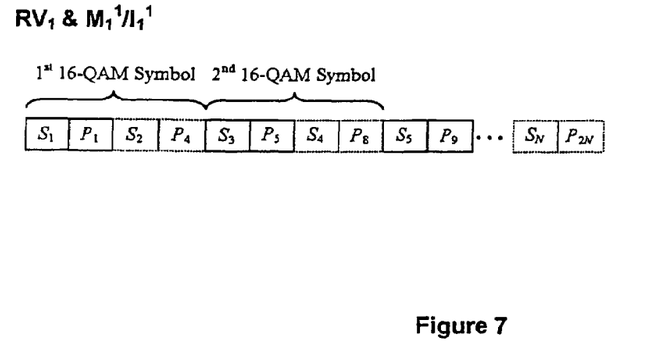
FIG. 7: a bit sequence for the first transmission redundancy version 1 and a first pair of mapper/interleaver.

FIG. 7 shows a bit sequence for the $1^{st}$ TX as $RV_1$ & $M_1^1/I_1^1$.

Figure 8:
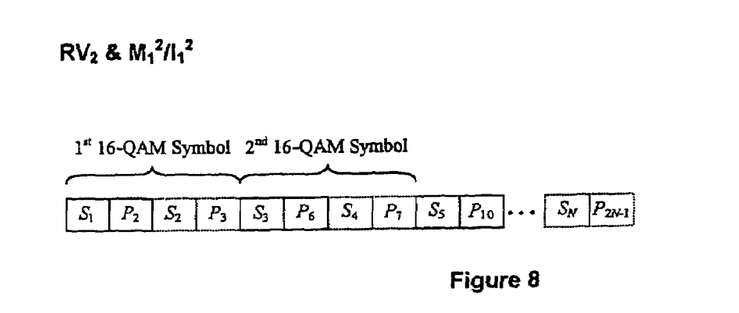
FIG. 8: a bit sequence for the second transmission for a redundancy version 2 with the same mapper/interleaver as for the first transmission.

For conventional schemes with multiple redundancy versions—not taking the variations in bit reliabilities into account, i.e. having a single mapper/interleaver as shown in the bit sequence for the sequence for the $2^{nd}$ transmission $RV_2$ & $M_1^2/I_1^2$ in FIG. 8—a similar problem arises as for schemes with a single redundancy version. Low reliable systematic bits from the $1^{st}$ TX will be low reliable in the $2^{nd}$ transmission.

Figure 9:
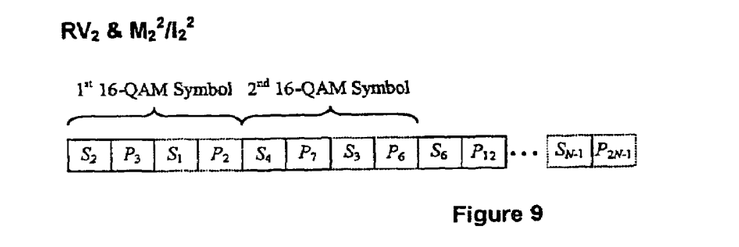
FIG. 9: a bit sequence for the second transmission a redundancy version 2 with different mappers/interleavers as for the first transmission.

Using 2 mappers/interleavers (see FIG. 9) the averaging will be performed for the systematic bits. However, after 2 transmissions averaging of the reliabilities is only possible for the bits transmitted twice so far (in this example the systematic bits). In the $3^{rd}$ TX one is free of choice which redundancy version to transmit $RV_1$ or $RV_2$ (performance for both possibilities should be very similar).

The example described above having 2 redundancy versions ($RV_1$ and $RV_2$) basically provides 4 combinations of redundancy versions and mappers/interleavers (see Table 3 and FIG. 10):

TABLE 3

| Possible Combinations |
|---|
| $RV_1$ & $I_1^1/M_1^1$ |
| $RV_1$ & $I_2^1/M_2^1$ |
| $RV_2$ & $I_1^2/M_1^2$ |
| $RV_2$ & $I_2^2/M_2^2$ |

In the following the set of bits transmitted in the $1^{st}$ TX will be labeled $RV_1$ (redundancy version 1) and the set of bits transmitted in the $2^{nd}$ TX will be labeled $RV_2$. Also, the mappers/interleavers are linked to the redundancy versions by a superscript. In the shown example the interleaver pattern and mapping for $I_n^1/M_n^1$ and $I_n^2/M_n^2$ (n=1, 2) are equal, which is a special case, because the positions of the systematic and parity bits are aligned to each other in both redundancy versions.

In accordance with the present invention, the mapper/interleaver has to be selected according to the chosen redundancy version in order to average out the reliabilities of the systematic and parity bits. This is contrary to the single redundancy version case, whereby the third transmission one can select any mapper/interleaver.

In the following, a strategy for selecting the mapper/interleaver depending on the transmitted redundancy version in order to average out all bit reliabilities is proposed.

$1^{st}$ TX

Let us assume the combinations $RV_1$ & $I_1^1/M_1^1$ is selected for the $1^{st}$ TX—any other combination could also be selected for $1^{st}$ transmission (assuming equal/similar performance considering a single transmission).

$2^{nd}$ TX

In the $2^{nd}$ TX the remaining redundancy version should be transmitted (in this case $RV_2$), where the reliabilities for all bits which have been already transmitted in the $1^{st}$ TX (in this case all systematic bits) have to be averaged, i.e. low reliable systematic bits have to be high reliable now. This is achieved by transmitting $RV_2$ with $I_2^2/M_2^2$.

$3^{rd}$ TX

For the $3^{rd}$ TX one is free which redundancy version to transmit, however it has to be combined with a mapper/interleaver, which has not been yet chosen for this redundancy version, i.e. $RV_1$ & $I_2^1/M_2^1$ in strategy 1 and $RV_2$ & $I_1^2/M_1^2$ in strategy 2. This ensures the averaging of the parity bits, which are transmitted in the current set of bits.

$4^{th}$ TX

For the $4^{th}$ TX the combination, which is left over has to be selected. This guarantees the averaging of the remaining set of parity bits and makes sure to transmit the set of parity bits, which have just been transmitted once so far.

$5^{th}$ and further TX

After the $4^{th}$ TX the averaging process is finished. Hence there is a free choice of redundancy version and mapper/interleaver combination. For following TXs the rules applied to TXs 1-4 have to be considered.

TABLE 4

| TX | Strategy 1 | Strategy 2 |
|---|---|---|
| 1 | $RV_1$ & $I_1^1/M_1^1$ | $RV_1$ & $I_1^1/M_1^1$ |
| 2 | $RV_2$ & $I_2^2/M_2^2$ | $RV_2$ & $I_2^2/M_2^2$ |
| 3 | $RV_1$ & $I_2^1/M_2^1$ | $RV_2$ & $I_1^2/M_1^2$ |
| 4 | $RV_2$ & $I_1^2/M_1^2$ | $RV_1$ & $I_2^1/M_2^1$ |
| 5 | ... | ... |

Figure 10:
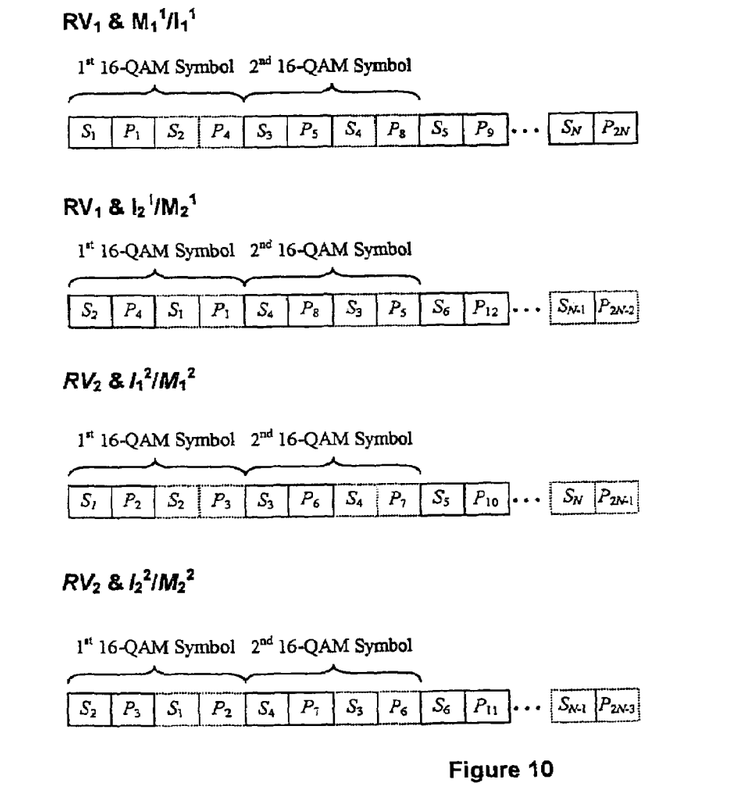
FIG. 10: resulting bit sequences from possible combinations of redundancy versions and mappers/interleavers.

In the provided example the positions of the systematic bits for both redundancy version $RV_1$ and $RV_2$ (considering same mapper/interleaver) are equal (see FIG. 10). This is not generally the case (especially for different coding rates) and is clearly a simplification. The shown example is intended to show the general procedure, which can be easily extended to more general cases mentioned below.

The proposed method is not restricted to 2 redundancy versions. Instead it can be extended to any number N of redundancy versions, which are selected to be transmitted consecutively and repeated after N transmissions as in a general HARQ Type II/III scheme with N redundancy versions.

Under the assumption that m denotes the actual mapper/interleaver version (m=1 . . . M) the number of mappers/interleavers per redundancy version might be any integer number M (resulting in at most in N·M different mappers/interleavers, where N denotes the total number of redundancy versions and M the number of mappers/interleavers per redundancy version), where the mapping rules or interleaver patterns are not necessarily designed to perform a perfect averaging of reliabilities. According to the example in Table 4, the general method is shown in Table 5, where (as mentioned earlier) all $I_m^n/M_m^n$ might have different mapping rules or interleaver patterns.

TABLE 5

| TX | Combination |
|---|---|
| 1 | $RV_1$ & $I_1^1/M_1^1$ |
| 2 | $RV_2$ & $I_1^2/M_1^2$ |
| 3 | $RV_3$ & $I_1^3/M_1^3$ |
| ... | ... |
| N | $RV_N$ & $I_1^N/M_1^N$ |
| N + 1 | $RV_1$ & $I_2^1/M_2^1$ |
| ... | ... |
| 2N | $RV_N$ & $I_2^N/M_2^N$ |
| ... | ... |
| N · (M − 1) + 1 | $RV_1$ & $I_M^1/M_M^1$ |
| ... | ... |
| N · M | $RV_N$ & $I_M^N/M_M^N$ |
| ... | ... |

As shown in the example, the mappers/interleavers $I_m^n/M_m^n$ could be the same for all redundancy versions n, i.e. mappers/interleavers are independent from n: $I_m/M_m$ (in total M different mappers/interleavers). The mapping rules or interleaver patterns might be chosen such that the averaging process for both the systematic bits and parity bits is as good as possible. Any pair of mappers/interleavers $I_m^n/M_m^n$, $I_k^j/M_k^j$ might have the same mapping rule or interleaver pattern.

Preferably, the number M of mappers/interleavers might be chosen according to the number of bit-reliability levels caused by the modulation scheme. Alternatively, the number M of mappers/interleavers might be chosen according to the twice the number of bit-reliability levels caused by the modulation scheme.

Figure 11:
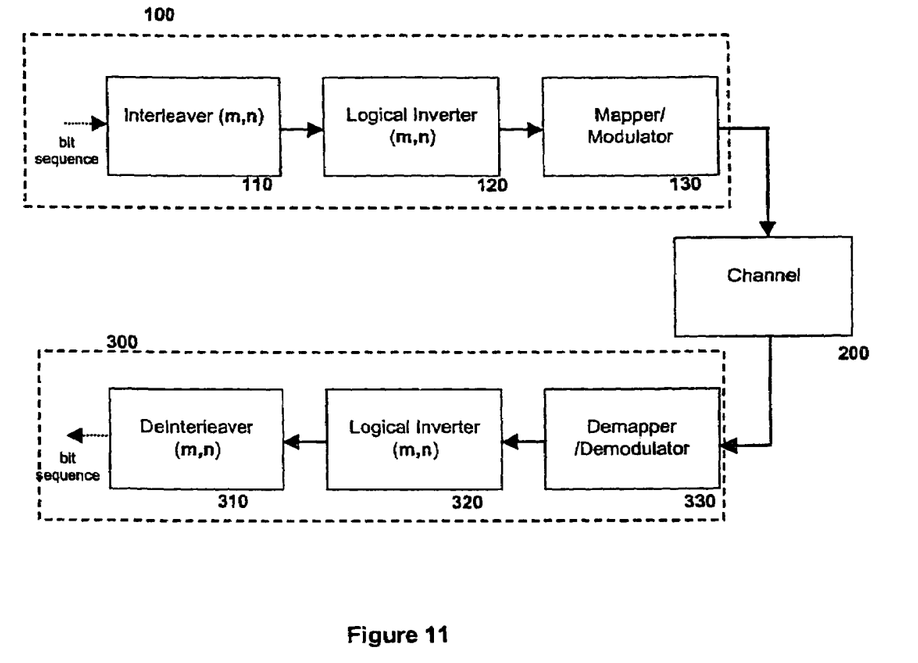
FIG. 11: a first embodiment of a communication system in which the method of the present invention is carried out.

FIG. 11 shows an exemplary first embodiment of a communication system in which the method underlying the invention is employed.

At the transmitter 100, a bit sequence is obtained from a forward error correction (FEC) encoder (not shown) and subsequently input into an interleaver 110 and a logical bit inverter 120. The interleaver 110 and logical bit inverter 120 are each functions of the redundancy version and/or the mapper/interleaver version m and modify the input bit sequence. Subsequently, the bit sequence is input into the mapper/modulator 130 being the mapping entity. The mapper typically uses one of the signal constellations shown in FIG. 2 and maps the bits onto a symbol which is transmitted over the communication channel 200. The communication channel is typically a radio communication channel experiencing unreliable and time-varying channel conditions.

The patterns used by the mappers, interleavers and inverters are either stored at both, the transmitter and the receiver or stored at the transmitter and signalled to the receiver.

At the receiver 300, the complex symbols are first input into a de-mapper/demodulator 330 which demodulates the received symbols into a corresponding bit domain sequence (e.g. sequence of LLRs). This sequence is then input into a logical inverter 320 and subsequently into a de-interleaver 310 from which the obtained bit domain sequence is output.

The interleaver and de-interleaver operate in accordance with the well known technique of interleaving/deinterleaving by applying a determined, pseudo-random or random permutation of the input bit or symbol sequences, i.e. change the positions of the bits or symbols within a sequence. In the above described embodiment, the interleaver (and the deinterleaver) are a intra-symbol bit (de-)interleaver which change the position of the bits that form a symbol in the mapper/demapper.

The logical bit inverter operates in accordance with a well known technique of inverting the logical value of a bit, i.e. turns a logical low to a logical high value and vice versa. In one practical realization of a receiver working with log likelihood ratios, this inverting operation is equivalent to a sign inversion of the log likelihood ratio.

If a retransmission is launched by an automatic repeat request issued by an error detector (not shown) with the result that another data packet is transmitted from the transmitter 100, in the de-mapper/demodulator 330, the previously received erroneous data packets are combined with the retransmitted data packets. Due to the modification of the bit sequence by the interleaver and the logical bit inverter, the mean bit reliabilities are averaged out resulting in an increased performance in the receiver.

Figure 12:
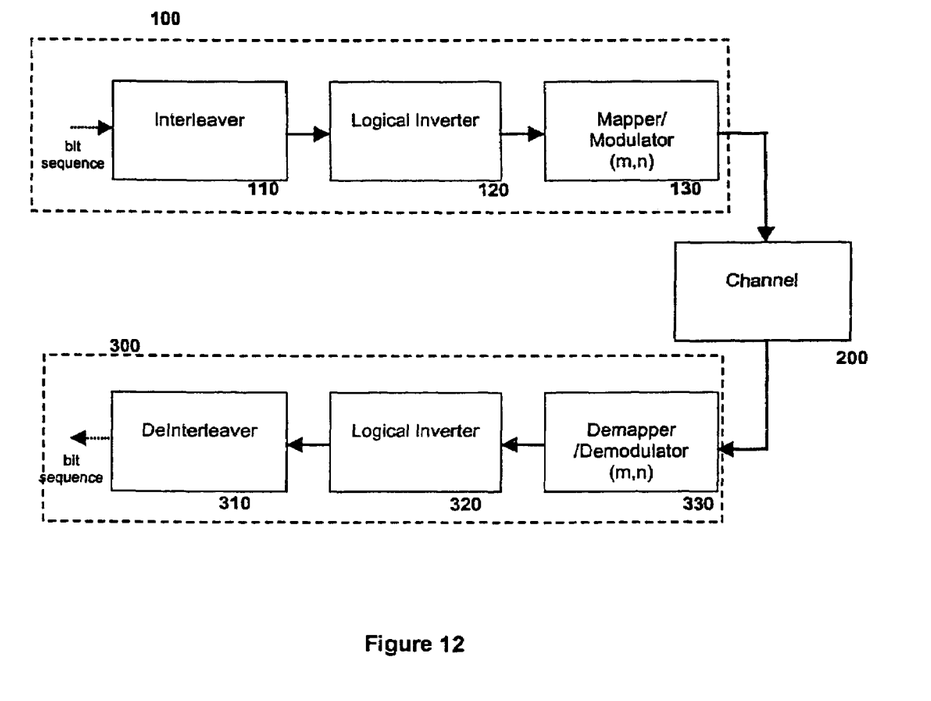
FIG. 12: a second embodiment of a communication system in which the method of the present invention is carried out.

As an alternative approach, in the second embodiment shown in FIG. 12, the pattern for interleaving/de-interleaving the bit sequence before sending same to the mapper is left constant to i.e. does not change as a function of the redundancy version n. Instead, the rules for mapping the bits onto a symbol are changed which corresponds to having input bit sequences into the mapper only depending on the redundancy version n and simply changing the bit-to-symbol mapping rules.

In a further variant, not explicitly shown in the figures, a combination of the two described approaches above can be used, i.e. mapper/interleaver and inverter depend on the redundancy version n and the mapper/interleaver version m.

Figure 13:
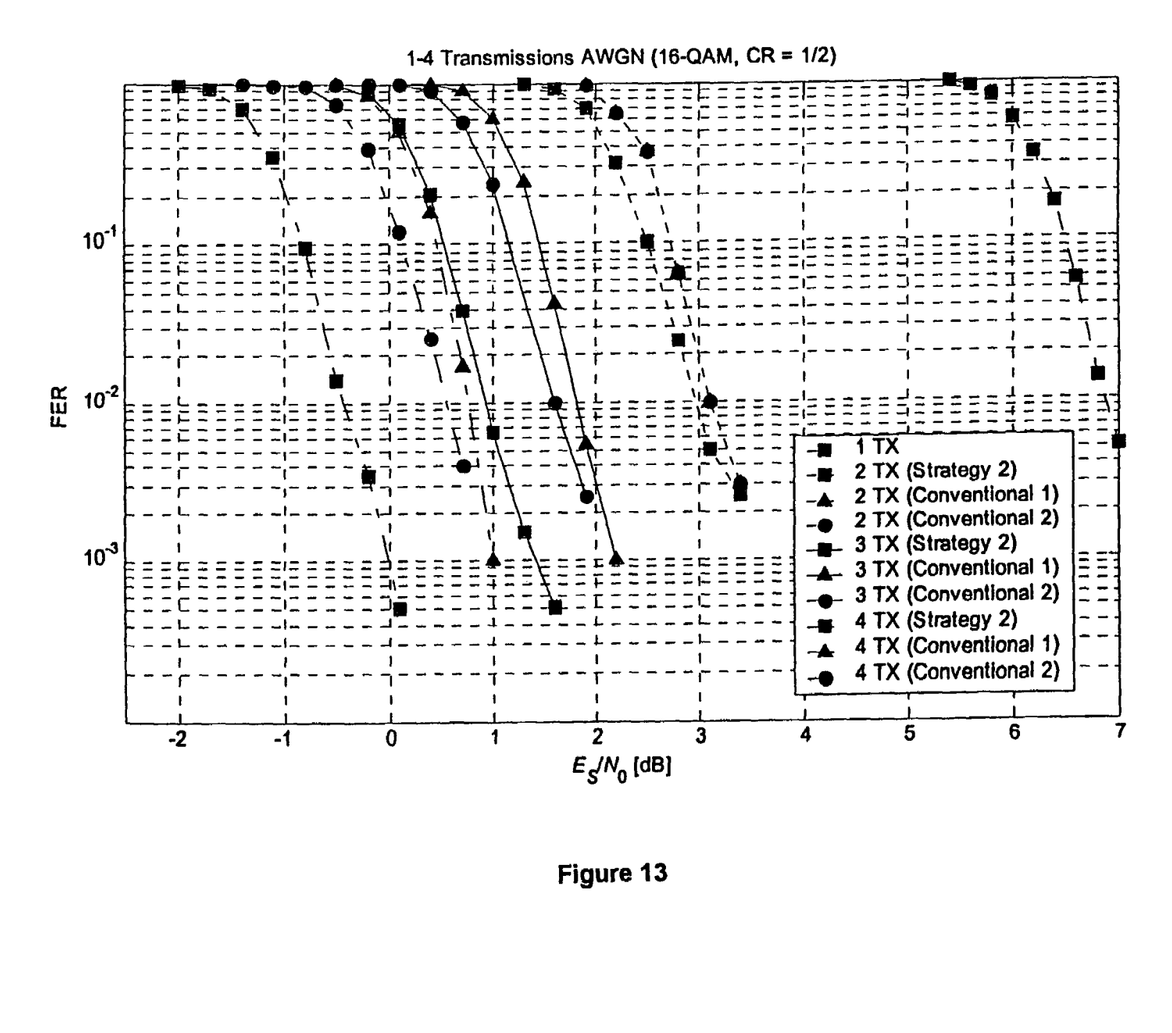
FIG. 13: a diagram indicating the performance of several conventional strategies versus the strategy according to the method of the invention.

FIG. 13 shows the result of a simulation measuring the frame error rate for a 16-QAM modulation scheme employing a code rate 1/2 for two conventional HARQ methods and one possible implementation of the method according the present invention. For this example, strategy 2 in below table 5 has been compared with two conventional strategies. It is obvious from FIG. 13 that the method according to the invention outperforms the conventional methods.

TABLE 5

| Scheme Transmission | Conventional 1 (using identical mapping for all transmissions) | Conventional 2 (alternating between mappings irrespective of redundancy version) | Strategy 2 (according to Table 3) |
|---|---|---|---|
| 1. TX | $RV_1$ & Mapping 1 ($M_1$) | $RV_1$ & $M^1$ | $RV_1$ & $M^1$ |
| 2. TX | $RV_2$ & $M^1$ | $RV_2$ & $M^2$ | $RV_2$ & $M^2$ |
| 3. TX | $RV_1$ & $M^1$ | $RV_1$ & $M^1$ | $RV_1$ & $M^2$ |
| 4. TX | $RV_2$ & $M^1$ | $RV_2$ & $M^2$ | $RV_2$ & $M^1$ |

In the table, the used redundancy versions ($RV_n$) and mappings ($M^m$) for simulated methods are listed, where the mappings $M_1^1 = M_2^1 = M^1$ and $M_1^2 = M_2^2 = M^2$ are according to Table 4 (i.e. identical mappings used for both redundancy versions). $M^1$ corresponds to constellation 1 and $M^2$ corresponds to constellation 2 in FIG. 2.

Although the method described above has been described using Gray-encoded signals and a QAM modulation scheme, it is clear to a skilled person that other suitable encoding and modulation schemes, e.g. PSK-modulation can be equally used in obtaining the benefits of the invention.

The invention claimed is:

1. A transmission apparatus for transmitting data using a HARQ process comprising:
   a transmission section that transmits data using one combination of a plurality of combinations, each of the combinations comprising one redundancy version of a plurality of redundancy versions and one constellation version of a plurality of constellation versions, at least one constellation version of the plurality of constellation versions being assigned to more than one of the redundancy versions.

2. The transmission apparatus according to claim 1, wherein each of the constellation versions defines at least one of (i) bit positions in a bit sequence comprising a plurality of bits and (ii) logical values of the bits in the bit sequence.

3. The transmission apparatus according to claim 1, wherein the constellation versions are different from each other with respect to at least one of (i) bit positions in a bit sequence comprising a plurality of bits and (ii) a logical value of a bit in the bit sequence.

4. The transmission apparatus according to claim 1, wherein one of the constellation versions is produced by rearranging a bit sequence comprising a plurality of bits.

5. The transmission apparatus according to claim 1, wherein one of the constellation versions is produced by at least one of (i) exchanging a bit with another bit in a bit sequence comprising a plurality of bits and (ii) inverting a logical value of a bit in the bit sequence.

6. The transmission apparatus according to claim 1, wherein one of the constellation versions is produced by, with respect to a bit sequence ($i_1 q_1 i_2 q_2$), one of (i) exchanging $i_1$ and $q_1$ with $i_2$ and $q_2$ and inverting logical values of $i_1$ and $q_1$, (ii) exchanging $i_1$ and $q_1$ with $i_2$ and $q_2$ and (iii) inverting logical values of $i_2$ and $q_2$.

7. The transmission apparatus according to claim 1, further comprising:
   a rearranging section that rearranges a bit sequence comprising a plurality of bits according to a constellation version of said one combination, to produce a rearranged bit sequence.

8. The transmission apparatus according to claim 1, further comprising:
   a rearranging section that operates to at least one of (i) exchange a bit with another bit in a bit sequence comprising a plurality of bits and (ii) invert a logical value of a bit in the bit sequence.

9. The transmission apparatus according to claim 1, further comprising:
   a rearranging section that operates, with respect to a bit sequence ($i_1 q_1 i_2 q_2$), to at least one of (i) exchange $i_1$ and $q_1$ with $i_2$ and $q_2$ and invert logical values of $i_1$ and $q_1$, (ii) exchange $i_1$ and $q_1$ with $i_2$ and $q_2$ and (iii) invert logical values of $i_2$ and $q_2$.

10. The transmission apparatus according to claim 7, further comprising:

a mapping section that maps the rearranged bit sequence to 16 QAM by a modulation mapper, wherein said transmission section thereafter transmits data as the rearranged bit sequence.

11. The transmission apparatus according to claim 1, wherein said transmission section (i) transmits first data using one of the combinations and (ii) transmits second data using another of the combinations.

12. The transmission apparatus according to claim 7, wherein said transmission section (i) transmits first data as the bit sequence before rearranging by the rearranging section and (ii) transmits second data as the rearranged bit sequence.

13. A reception apparatus comprising:

a receiving section that receives data transmitted by the transmission apparatus according to claim 1.

14. A transmission system comprising:

a transmission apparatus according to claim 1, and a reception apparatus comprising a receiving section that receives data transmitted by said transmission apparatus.

15. A transmission method for transmitting data using a HARQ process comprising:

transmitting data using one combination of a plurality of combinations, each of the combinations comprising one redundancy version of a plurality of redundancy versions and one constellation version of a plurality of constellation versions, at least one constellation version of the plurality of constellation versions being assigned to more than one of the redundancy versions.

16. The transmission method according to claim 15, further comprising:

selecting a combination from the plurality of combinations, wherein said data is transmitted using the selected combination.

17. The transmission method according to claim 15, wherein each of the constellation versions defines at least one of (i) bit positions in a bit sequence comprising a plurality of bits and (ii) logical values of the bits in the bit sequence.

18. The transmission method according to claim 15, wherein the constellation versions are different from each other with respect to at least one of (i) bit positions in a bit sequence comprising a plurality of bits and (ii) a logical value of a bit in the bit sequence.

19. The transmission method according to claim 15, wherein one of the constellation versions is produced by rearranging a bit sequence comprising a plurality of bits.

20. The transmission method according to claim 15, wherein one of the constellation versions is produced by at least one of (i) exchanging a bit with other in a bit sequence comprising a plurality of bits and (ii) inverting a logical value of a bit in the bit sequence.

21. The transmission method according to claim 15, wherein one of the constellation versions is produced by, with respect to a bit sequence ($i_1 q_1 i_2 q_2$), one of (i) exchanging $i_1$ and $q_1$ with $i_2$ and $q_2$ and inverting logical values of $i_1$ and $q_1$, (ii) exchanging $i_1$ and $q_1$ with $i_2$ and $q_2$ and (iii) inverting logical values of $i_2$ and $q_2$.

22. The transmission method according to claim 15, further comprising:

rearranging a bit sequence comprising a plurality of bits according to a constellation version of said one combination, to produce a rearranged bit sequence.

23. The transmission method according to claim 15, further comprising:

operating to at least one of (i) exchange a bit with another bit in a bit sequence comprising a plurality of bits and (ii) invert a logical value of a bit in the bit sequence.

24. The transmission method according to claim 15, further comprising:

operating, with respect to a bit sequence ($i_1 q_1 i_2 q_2$), to at least one of (i) exchange $i_1$ and $q_1$ with $i_2$ and $q_2$ and invert logical values of $i_1$ and $q_1$, (ii) exchange $i_1$ and $q_1$ with $i_2$ and $q_2$ and (iii) invert logical values of $i_2$ and $q_2$.

25. The transmission method according to claim 22, further comprising:

mapping the rearranged bit sequence to 16 QAM by a modulation mapper, wherein data is thereafter transmitted as the rearranged bit sequence.

26. The transmission method according to claim 15, wherein first data is transmitted using said one combination, and said method further comprises transmitting second data using another combination of said plurality of combinations.

27. The transmission method according to claim 22, wherein first data is transmitted as the bit sequence prior to the rearranging, and said method further comprises transmitting second data as the rearranged bit sequence.

28. A reception method comprising:

receiving data transmitted by the transmission method according to claim 15.

29. A reception apparatus for receiving data transmitted using a HARQ process comprising:

a receiving section that receives data transmitted using one combination of a plurality of combinations, each of the combinations comprising one redundancy version of a plurality of redundancy versions and one constellation version of a plurality of constellation versions, at least one constellation version of the plurality of constellation versions being assigned to more than one of the redundancy versions.

30. The reception apparatus according to claim 29, further comprising:

a demodulating section that demodulates the received data.

31. The reception apparatus according to claim 29, wherein each of the constellation versions defines at least one of (i) bit positions in a bit sequence comprising a plurality of bits and (ii) logical values of the bits in the bit sequence.

32. The reception apparatus according to claim 29, wherein the constellation versions are different from each other with respect to at least one of (i) bit positions in a bit sequence comprising a plurality of bits and (ii) a logical value of a bit in the bit sequence.

33. The reception apparatus according to claim 29, wherein one of the constellation versions is produced by at least one of (i) exchanging a bit with other in a bit sequence comprising a plurality of bits and (ii) inverting a logical value of a bit in the bit sequence.

34. The reception apparatus according to claim 29, further comprising:

a rearranging section that operates to at least one of (i) exchange a bit with another bit in a bit sequence comprising a plurality of bits of the received data and (ii) invert a logical value of a bit in the bit sequence.

35. The reception apparatus according to claim 29, wherein said receiving section (i) receives first data transmitted using one of the combinations and (ii) receives second data transmitted using another of the combinations.

36. The reception apparatus according to claim 35, further comprising:

a combining section that combines the first data with the second data.

37. A reception method for receiving data transmitted using a HARQ process comprising:

receiving data transmitted using one combination of a plurality of combinations, each of the combinations comprising one redundancy version of a plurality of redundancy versions and one constellation version of a plurality of constellation versions, at least one constellation version of the plurality of constellation versions being assigned to more than one of the redundancy versions.

38. The reception method according to claim 37, further comprising:

demodulating the received data.

39. The reception method according to claim 37, further comprising:

operating to at least one of (i) exchange a bit with another bit in a bit sequence comprising a plurality of bits of the received data and (ii) invert a logical value of a bit in the bit sequence.

40. The reception method according to claim 37, wherein first data transmitted using said one combination is received, and said method further comprises receiving second data transmitted using another of the combinations.

41. The reception method according to claim 40, further comprising:

combining the first data with the second data.

* * * * *